United States Patent Office 3,300,536
Patented Jan. 24, 1967

3,300,536
PREPARATION OF 2,2'-DIHYDROXY-1,1'-BINAPHTHYL
Edward J. McNelis, Wallingford, Pa., assignor to Sun Oil Company, Philadelphia, Pa., a corporation of New Jersey
No Drawing. Filed Nov. 6, 1963, Ser. No. 321,665
4 Claims. (Cl. 260—620)

This invention relates to a method for preparing 2,2'-dihydroxy-1,1'-binaphthyl.

The subject compound is well known, having been reported in the literature in Ber. 15, 2166 and Ber. 38, 3662. This compound is known to be useful as a fungicide and dyestuff material. It has been prepared from 2-naphthol by several methods including (1) reaction in the presence of ferric chloride and (2) reaction in the presence of cupric acetate. Although the reported preparations of the subject compound give appreciable yields, they are conducted in dilute aqueous solutions, necessitating a multiplicity of processing steps.

A method has now been found whereby 2,2'-dihydroxy-1,1'-binaphthyl can be prepared directly from 2-naphthol utilizing activated manganese dioxide.

Briefly, the instant invention comprises heating 2-naphthol in the presence of activated manganese dioxide at a temperature in the range of 20° C. and the decomposition temperature of 2-naphthol for a period of time ranging between 5 minutes and 25 hours and recovering 2,2'-dihydroxy-1,1'-binaphthyl.

"Activated manganese dioxide" is a well known material (see Evans, Quarterly Reviews, 13, pp. 61–70, 1959). It is a form of hydrated manganese dioxide and is generally prepared by reacting manganese sulfate with potassium permanganate in a hot aqueous solution in the presence of sufficient alkali to insure that the reaction mixture remains alkaline after being washed with water. The resulting slurry is dried at 100°–120° C. and activated manganese dioxide is recovered. It can also be prepared by reacting manganese sulfate and potassium permanganate in a hot aqueous solution in the absence of any alkali. The resulting mixture becomes strongly acidic and after drying the slurry at 100°–120° C., activated manganese dioxide is recovered. Activated manganese dioxide is also prepared by heating manganese oxalate or manganese carbonate at 250° C. The resulting product may be used as produced or it can be washed with dilute aqueous nitric acid and subsequently dried at 230° C.

As stated above, in accordance with this invention, 2-naphthol is heated in the presence of activated manganese dioxide to produce 2,2'-dihydroxy-1,1'-binaphthyl. The use of activated manganese dioxide is critical to the success of this invention, since ordinary manganese dioxide is not operable herein. The 2-naphthol can be heated with the activated manganese dioxide either in the presence or absence of a solvent material and in the presence or absence of air.

It is preferred that prior to heating the 2-naphthol in the presence of activated manganese dioxide, that it be dissolved in a suitable solvent and that the activated manganese dioxide be added to the resulting solution. Examples of suitable solvents include chloroform, benzene, toluene, nitrobenzene, and dimethylformamide. Chloroform and benzene are the preferred solvents.

The temperature at which the 2-naphthol-activated manganese dioxide mixture is heated can vary over a wide range. It has been found that substantial amounts of product are formed at a temperature as low as 20° C. If the 2-naphthol is contained in a solvent, the maximum temperature at which the reaction mass can be heated is governed by the boiling point of the solvent at the pressure used. While temperatures in the range of 20° C. to as high as the decomposition temperature of 2-naphthol can be used in this invention, it is preferred that a temperature between about 60° C. and 250° C. be used.

The time that the reaction mixture is heated can vary between 5 minutes and 25 hours. It is preferred that the heating time range between about 0.5 hour and 2 hours.

The molar ratio of activated manganese dioxide to 2-naphthol can also vary over wide limits. It has been found that if trace amounts of activated manganese dioxide are present in the reaction mass, there is produced some of the desired product. It is preferred, however, that in order to optimize the amount of 2,2'-dihydroxy-1,1'-binaphthyl produce the molar ratio of activated manganese dioxide to 2-naphthol be between about 0.5:1 and 100:1, with a molar ratio between about 3:1 and 10:1 being most preferred.

To recover the desired product, the manganese dioxide is separated from the reaction mixture by conventional methods such as filtration. If the reaction is not conducted in a solvent, the reaction mass must be filtered at an elevated temperature to prevent freezing of any unreacted 2-naphthol. The filtrate is washed with dilute (5%) alkali metal hydroxide to convert all of the phenolic materials contained therein to the alkali metal salts. The basic solution is then acidified with a mineral acid to reform a mixture of phenolic materials. The acid solution is extracted with diethyl ether and upon evaporation of the ether the oily residue is washed with low boiling petroleum ether to remove any unreacted 2-naphthol. The residue is the desired product which can be further purified, for example, by crystallization.

The following examples serve to further illustrate the instant invention.

*Example I*

To 4.32 gm. of 2-naphthol dissolved in 50 ml. of benzene there were added 8.7 gm. of activated manganese dioxide. The resulting mixture was heated at reflux temperature for 2 hours under an atmosphere of nitrogen. At the end of the reaction time the mixture was separated by filtration. The benzene solution was washed with 100 volume percent of 5 percent sodium hydroxide. Acidification of the basic solution with concentrated hydrochloric acid produced an oil which was extracted with portions of diethyl ether. The ether was evaporated leaving an oily residue which was washed with portions of low boiling petroleum ether. There was recovered an oily product in a 38% yield based on the weight of 2-naphthol which was identified as 2,2'-dihydroxy-1,1'-binaphthyl by infrared comparison with authentic material.

*Example II*

Example I was repeated except that ordinary reagent grade (unactivated) manganese dioxide was used in place of activated manganese dioxide. There was obtained an oily product which was identified as 2-naphthol, thus showing that unactivated manganese dioxide is ineffective in preparing the subject compound in accordance with the instant invention.

I claim:

1. Method for preparing 2,2'-dihydroxy-1,1'-binaphthyl which comprises heating 2-naphthol in the presence of activated manganese dioxide at a temperature between 20° C. and the decomposition temperature of 2-naphthol for a period of time ranging between 5 minutes and 25 hours and thereafter recovering said 2,2'-dihydroxy-1,1'-binaphthyl.

2. Method in accordance with claim 1 wherein the temperature is in the range of 60° C. and 250° C. and the time ranges between 0.5 hour and 2 hours.

3. Method for preparing 2,2'-dihydroxy-1,1'-binaphthyl which comprises dissolving 2-naphthol in a solvent selected from the group consisting of chloroform, benzene, oluene, nitrobenzene and dimethylformamide and heating the resulting solution in the presence of activated manganese dioxide at a temperature between 20° C. and the decomposition temperature of 2-naphthol for a period of time ranging between 5 minutes and 25 hours and thereafter recovering said 2,2'-dihydroxy-1,1'-binaphthyl.

4. Method in accordance with claim 3 wherein the temperature is between 60° C. and 250° C. and the time ranges between 0.5 hour and 2 hours.

No references cited.

BERNARD HELFIN, *Primary Examiner.*

LEON ZITVER, *Examiner.*

D. M. HELFER, *Assistant Examiner.*